April 5, 1927. 1,623,288
J. F. TOPINKA ET AL
CHEESE CUTTER
Filed June 10, 1926    2 Sheets-Sheet 2
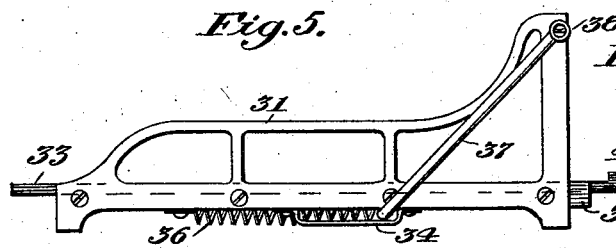
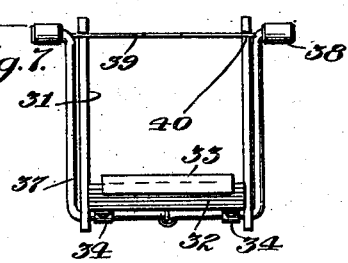
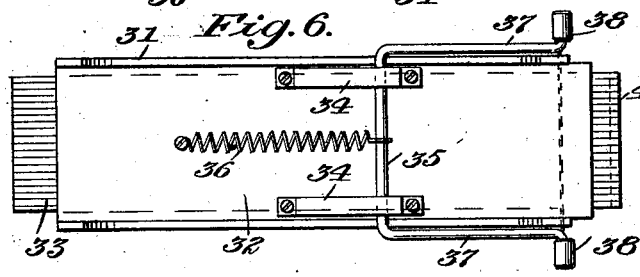
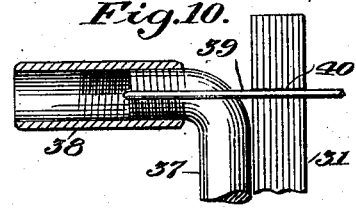
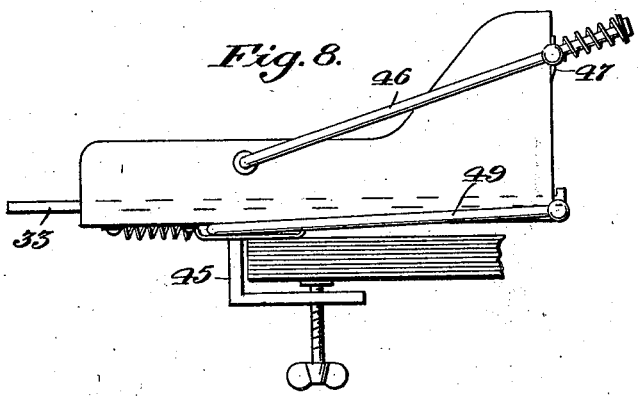
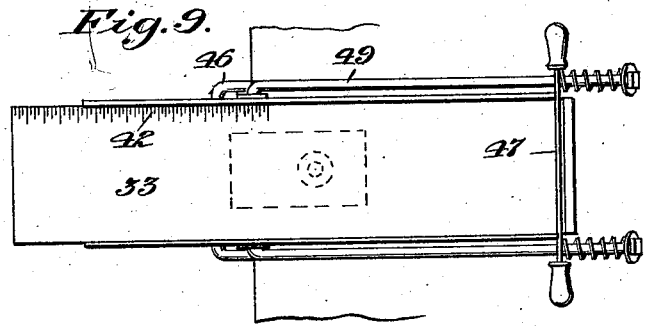
Inventors:
Joseph F. Topinka
and Otto J. Weichart,
by Joseph W. Harris
Atty.

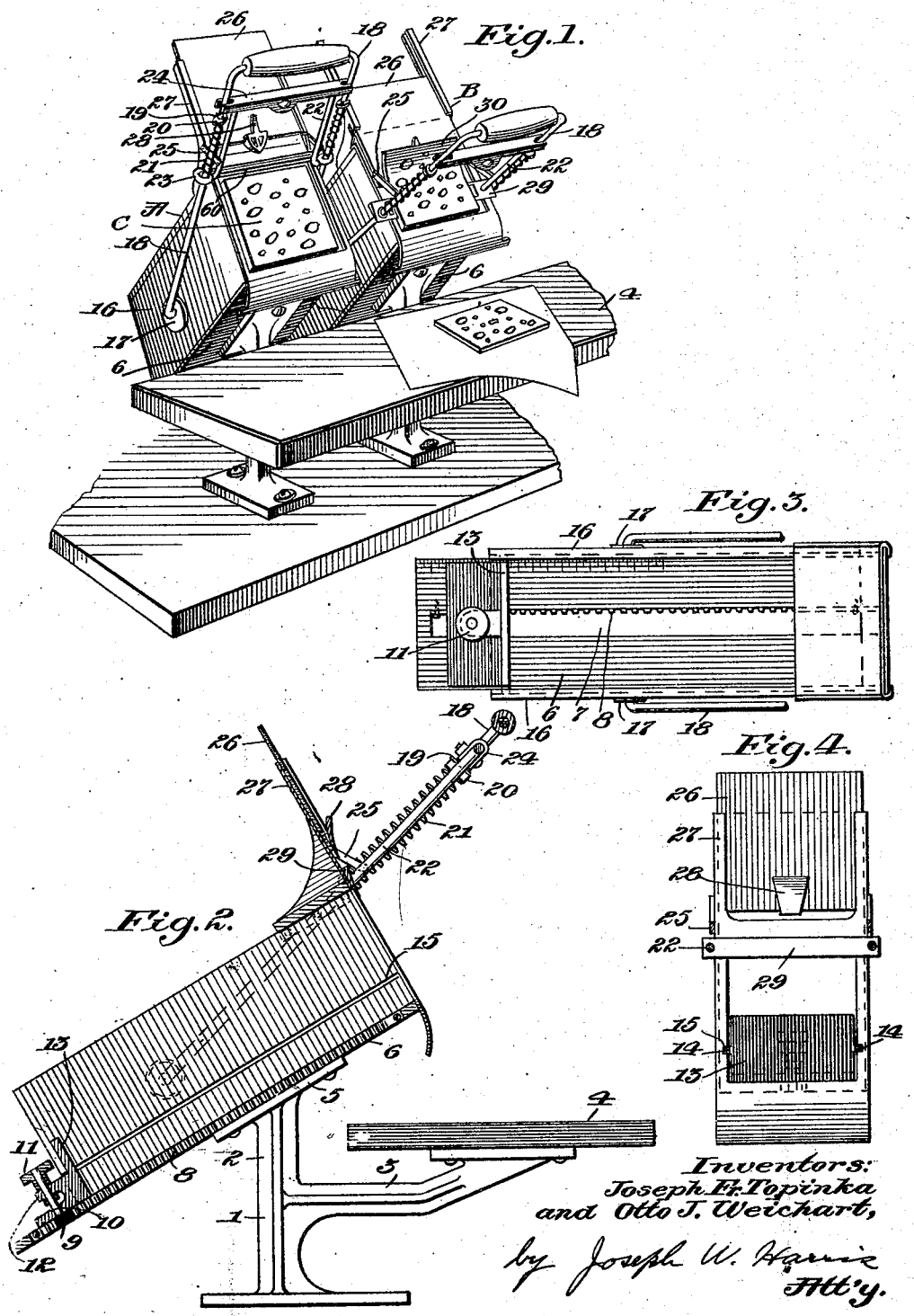

Patented Apr. 5, 1927.

1,623,288

UNITED STATES PATENT OFFICE.

JOSEPH FR. TOPINKA, OF CLEVELAND, AND OTTO J. WEICHART, OF EAST CLEVELAND, OHIO.

CHEESE CUTTER.

Application filed June 10, 1926. Serial No. 114,943.

This invention relates to cutting and dispensing machines, and is especially useful for cutting predetermined quantities of cheese, or products of about the same characteristics, that are shaped in substantially uniform sizes of loaves or bricks, and from which sections, or slices are cut as desired.

An object of the invention is to provide a machine which is practical, sanitary, of pleasing appearance, and reliable as to weight and dimensions of cheese cut from the larger loaf, and that provides for the substitution of different varieties of cheese.

In the accompanying drawings:

Figure 1 is a view in perspective of two completely assembled cutting machines, for two different kinds of cheese, mounted for use, one of said machines showing a slice of cheese partly cut from the stock;

Figure 2 is a longitudinal sectional view of the cutter;

Figure 3 is a top view of the cutter looking into the open casing;

Figure 4 is a front view of the cutter with the handle removed and showing parts of the interior;

Figures 5, 6 and 7 are side, bottom, and front-end plan views, respectively, of a modified form of cutting machine constructed to be placed on a table;

Figures 8 and 9 are side and top plan views respectively of a further modification, and Figure 10 is an enlarged detail, showing how the wire cutter is secured to the end of the handle.

Figure 1 illustrates two types of cutting machines. The machine at the left, marked A, is provided with a wire cutter, described hereafter, to be used for cutting soft cheese, while the machine at the right, marked B, is provided with a stiff knife blade cutter to be used on hard cheese.

In Figure 2, a standard 1 has supporting brackets 2 and 3, the latter supporting a shelf 4. The bracket 2 has an inclined plate 5, to which is attached the base 6 of the cutter. The base 6 is slotted as at 7, Figure 3, and is provided with a rack 8 which engages the pinion 9 on the end of the shaft 10, which latter is provided with a knob 11. The base 6 is provided with graduations, Fig. 3, to indicate the weight of cheese to be cut. The shaft 10 is mounted in the bearing 12 which is a part of the back-rest 13, the sides of the back rest being provided with lugs or tongues 14, Fig. 4, which slide in the grooves 15, Figures 2 and 4. A loaf of cheese, C, Fig. 1, is placed on the base 6, against the back-rest 13. Upon turning the knob 11, the pinion 9 travels along the rack 8 and the back-rest 13 is advanced or retracted, exposing graduations on the cutter base 6, according to the direction in which the knob 11 is turned, Figures 2 and 3. When advanced, the cheese is pressed forward on the base 6. Upon the outer sides 16, 16 of the frame of the cutter are sockets 17, in which are the ends of the loop handle arm 18. On each arm near the bend of the loop handle are small holes, through which pass the pins 19, 19, Fig. 1, and against which are pressed the washers 20, 20, by the springs 21, 21. Upon the loop arm 18 is a knife-supporting arm 22, the lower ends of which are folded around the arms 18, as at 23, below the spring and the upper bend of arm 22 being held in the guide 24, the ends of which latter engage the arms 18 as shown in Figure 1. The arm 22 carries the wire cutter 60, constructed and supported as described under Figs. 5, 6, 7, and 10. To the arm 22 are attached links 25, 25 which raise and lower a glass lid 26, retained in the guides 27, 27 by the movement of the handle 18, see Figure 1. Upon the glass lid 26 is a lifter 28 which slips behind a slice of cheese, 30, Fig. 1, that is in process of being cut off, and dislodges it. In the cutter "B" at the right in Fig. 1, the arm 22 carries a perforated knife 29, Figs. 1, 2 and 4, which is maintained under pressure against the front of the machine by springs 21, 21 and which cuts off the slice of cheese 30 by the operation of handle 18, the movement of the handle 18 in an upper direction raising the glass lid and the knife, while movement in the other direction, after pushing the cheese forward by the handle 11 cuts off the slice of cheese and closes the glass over the front of the loaf of cheese.

The modification shown in Figures 5, 6 and 7 has side frames, 31, 31, base 32 and the slide 33. On the under side of the base are brackets 34, 34 in which slides the loop 35 and which is held under tension by spring 36. The outer extremities 37, 37 of the loop 35 are provided with detachable sleeve handles 38, 38, which are constructed to hold the ends of a wire knife cutter 39, Fig. 7, the loop extremities being slotted or otherwise constructed to hold the wire 39 taut, and to engage or support the handles. When the machine is not in use, the wire may rest in the notches 40, 40 at the upper ends of the side frames 31, 31. In operation, a loaf of cheese is placed upon the slide 33, and the slide adjusted by movement of its front extremity 41 to project a desired quantity of cheese, as indicated by the scale 42 on the slide, see Fig. 9, the wire cutter having been previously placed in the notches 40. The cutter is now pressed down upon the exposed cheese, and the latter severed, the spring 36 retracting the loop 35, and holding the wire cutter against the front edges of the sides 31, 31.

Since different makes of cheese have different specific gravities, several slides 33 may be provided, each graduated for a special cheese, and one slide may be removed with its loaf of cheese, and a different one with a different cheese, inserted, the removed slide and cheese being placed in a refrigerator. This procedure avoids handling the cheese.

In the modification shown in Figures 8 and 9, the under side of the base is provided with a clamp 45, by which the machine is secured to a table. This type of machine is adapted to cut both hard and soft cheese, and is provided with two handles, an upper one, 46, which holds a knife cutter 47, and which is constructed like the knife cutter 29 in Figures 1, 2, 3 and 4. The lower handle 49, holds a wire cutter resembling the cutter 39, which may be retained out of use below the slide 33, and which is held in handle 49 in a manner similar to the wire cutter 39 of Figures 5, 6 and 7. The sides and base of this machine may be made of one piece of metal, the clamp 45 being stamped out of the base. All metal parts should be suitably coated, as by enameling or nickel plating.

We claim:

1. In a cutting and dispensing machine means for exposing predetermined quantities of product to be cut, a movable cutting knife for cutting off the section exposed, means for detaching the cut section, a glass cover for the exposed surface of the stock, means for raising and lowering said glass cover at the time the cutting knife is raised and lowered.

2. In a cheese cutter, means for supporting the cheese, means for exposing a predetermined section of cheese to be cut, a movable cutting element, means for retaining said cutting element in the cutting plane, graduations upon the cheese support, a movable glass cover for the exposed surface of the cheese, means cooperating with the glass cover and the cutting element whereby the glass cover is raised aid lowered when the cutting element is raised and lowered, and means for detaching the cut section of cheese.

In testimony whereof we hereby affix our signatures.

JOSEPH FR. TOPINKA.
OTTO J. WEICHART.